United States Patent

[11] 3,603,992

| [72] | Inventors | William B. Goggins, Jr.<br>Dayton, Ohio;<br>John K. Schindler, Chelmsford, Mass. |
|---|---|---|
| [21] | Appl. No. | 876,422 |
| [22] | Filed | Nov. 13, 1969 |
| [45] | Patented | Sept. 7, 1971 |
| [73] | Assignee | The United States of America as represented by the Secretary of the Air Force |

[54] DUAL HARMONIC FREQUENCY SYNTHETIC APERTURE RADAR
3 Claims, 5 Drawing Figs.

| [52] | U.S. Cl. | 343/5 R, 343/5 CM, 343/17.1 R |
|---|---|---|
| [51] | Int. Cl. | G01s 9/02 |
| [50] | Field of Search | 343/5, 5 CM, 17.1 |

[56] References Cited
UNITED STATES PATENTS

| 3,079,557 | 2/1963 | Crabtree | 343/6.8 X |
|---|---|---|---|
| 3,178,711 | 4/1965 | Case, Jr. | 343/5 CM |
| 3,234,547 | 2/1966 | Katzin | 343/17.1 X |
| 3,374,478 | 3/1968 | Blau | 343/5 |

Primary Examiner—Malcolm F. Hubler
Attorneys—Harry A. Herbert, Jr. and George Fine ABSTRACT: A dual harmonic frequency synthetic aperture radar system in which synthetic aperture processing is used to achieve high angular resolution for two radars which operate at two or more harmonically related frequencies. These frequencies are related by the factor N. The processing is done so as to preserve the phase of the target return. After the synthetic aperture processing is completed, the phase angles are available at the two frequencies. The lower frequency phase angle is multiplied by N and compared with the phase angle at the upper frequency to obtain phase signature data on the target.

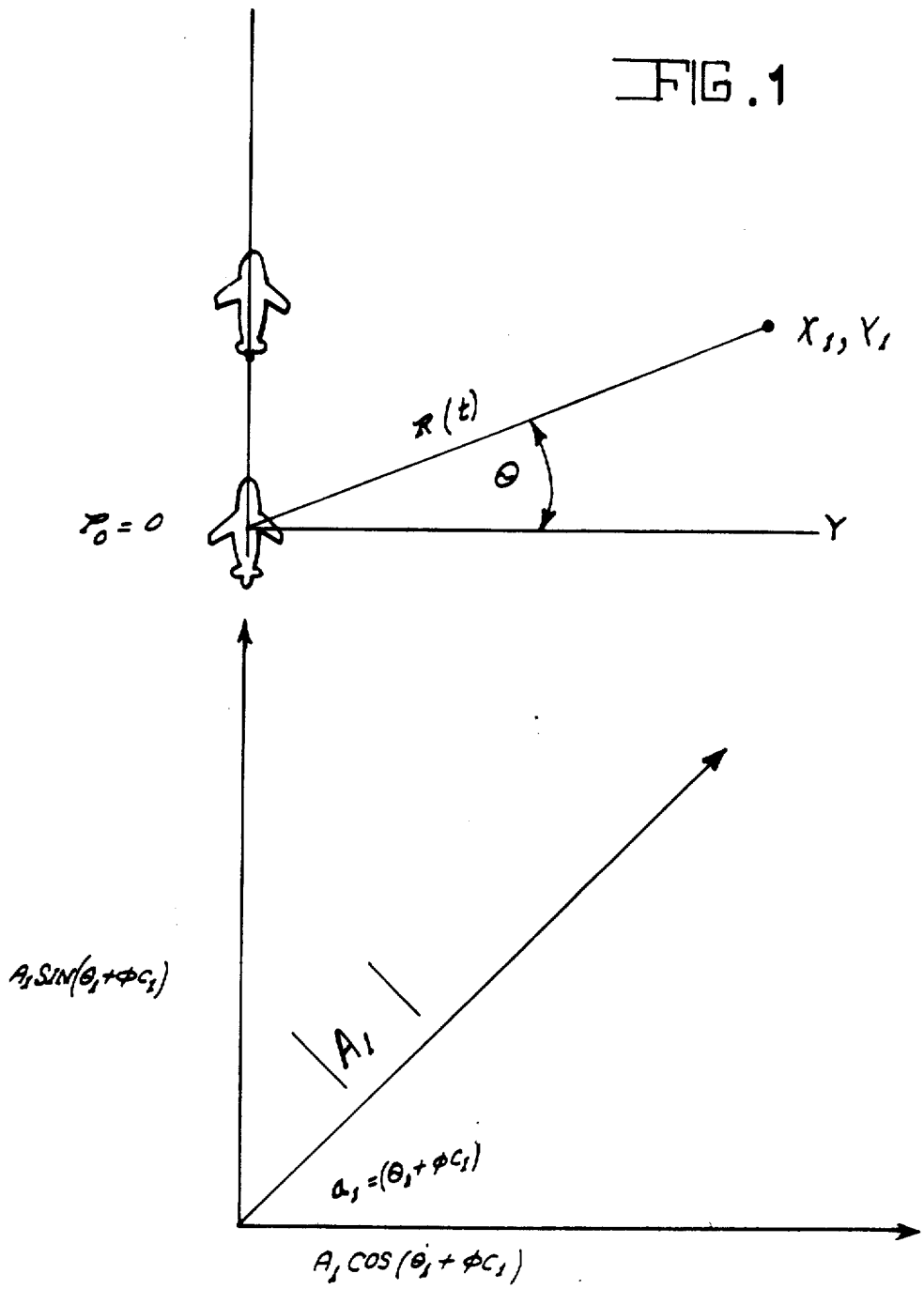

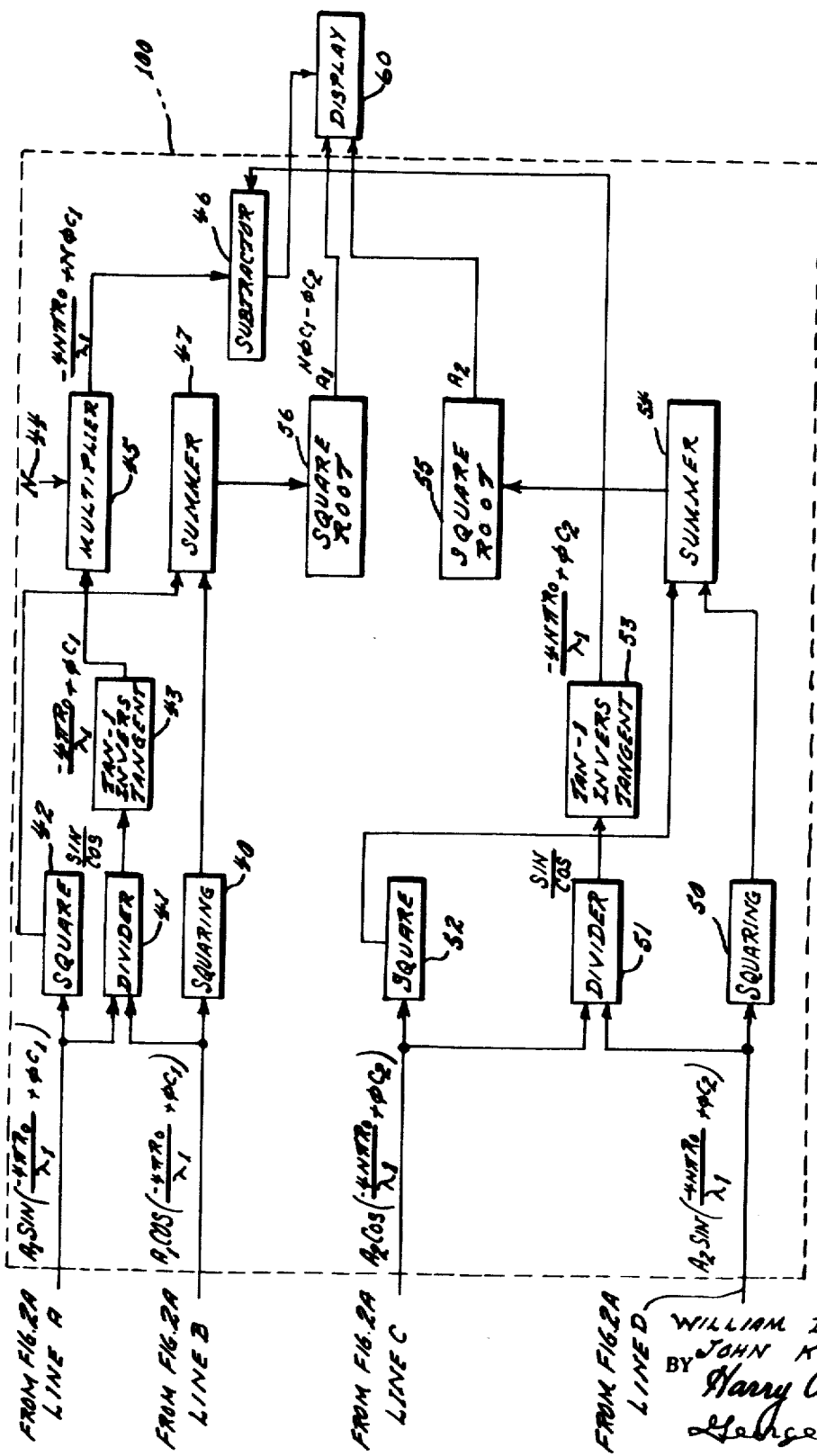

DUAL HARMONIC FREQUENCY SYNTHETIC APERTURE RADAR

BACKGROUND OF THE INVENTION

This invention relates to radar systems and more particularly a dual harmonic frequency synthetic aperture radar system in which after synthetic aperture processing a comparison of the phases of the returns from a target at two or more harmonically related frequencies is made to provide a characteristic phase of the target which can be used to help identify the target.

A crucial problem associated with the airborne use of low frequency radars which have the advantage of enhanced signal returns from resonant targets, is the lack of antennas of adequate angular resolution. The synthetic aperture principle described in the foregoing has a high potential to overcome this problem, at least in the sense that sufficient azimuth angle resolution can be obtained from a side-looking radar. Additional target information is obtained from evaluating the characteristic target phase which is compatible with the synthetic aperture technique. It is also noted that this invention solves the problem of obtaining target phase information with a radar set, although the range is not known accurately, to a few tenth's of a wavelength.

The present invention can be used for the location and identification of fixed or slowly-moving ground targets. When used with radars operating at HF (high frequency) or UHF (ultra-high frequency), the radar is capable of penetrating dense foliage and yet distinguishing targets from clutter objects of the same radar cross sections.

SUMMARY OF THE INVENTION

The dual harmonic frequency synthetic aperture radar is a system in which synthetic aperture processing is used to achieve high angular resolution for two radars which operate at two or more harmonically related frequencies. These frequencies are related by the factor N. The synthetic aperture technique is basically an arraying technique in which only one element is used and it is moved from place to place. The signal from each element is then stored until the element is moved through all positions. The signals are then shifted in phase so as to add up properly to form the beam. The vehicle to move the element is usually an aircraft, although any method of imparting motion may be used. After the synthetic aperture processing is completed, the phase angles are available at two frequencies. The lower phase angle is multiplied by N and compared with the phase angle at the upper frequency to obtain phase signature data on the target.

One of the novel features of the invention is the comparison after processing of the phases of the returns from a target at two or more harmonically related frequencies. This comparison will yield a characteristic phase of the target which can be used to help identify the target. Because of the way the measurement is made, this characteristic phase will be independent of target range.

An object of the present invention is to provide a dual harmonic synthetic radar system in which the phases of returns from a target are compared to provide a characteristic phase signal of the target for identification purposes.

Another object of the present invention is to provide a dual harmonic frequency synthetic radar system in which a comparison is made after processing of the phases of the returns from a target at two or more harmonically related frequencies to provide a characteristic phase of the target to be utilized for identification.

These and other advantages, features and objects of the invention will become more apparent from the following description taken in connection with the illustrative embodiment in the accompanying drawings, wherein:

DESCRIPTION OF THE DRAWINGS

FIG. 1 shows a graphic drawing to explain the synthetic aperture technique;

FIGS. 2A and 2B show a block diagram of a preferred embodiment of the system of the present invention;

FIG. 4 shows a phasor diagram for FIG. 3.

DESCRIPTION OF THE PREFERRED EMBODIMENT

In order to best understand the invention, it is first necessary to describe mathematically the synthetic aperture technique. The synthetic aperture technique is basically an arraying technique. In an ordinary array antenna many elements are spaced along the aperture and the energy from each element is phased properly in order to add vectorially to the energy from the other elements in such a manner as to form a beam. In a synthetic array radar only one element is used and is moved from place to place. The signal from each element is then stored until the element is moved through all the positions. The signals are then shifted in phase so as to add up properly to form the beam. The vehicle to move the element is usually an aircraft, although any method of imparting motion may be used.

To derive the phase of the return signal from each element position, consider FIG. 1. An aircraft carrying the radar starts at $P_0=0, 0$. One wishes to focus a beam on position $x_1, y_1$. The range to $x_1, y_1$ as a function of the aircraft position, $x=Vt$, is given by $$R(t) = y_1^2 + (x_1 - Vt)^2.$$

If a signal is transmitted at frequency $\Phi_1$ the phase shift of the return signal from an isotropic scatterer is $$\varphi_1(t) = \omega_1(t) - \frac{4\pi R_0}{\lambda_1} \sqrt{1 + \frac{V^2 t^2 - 2V x_1 t}{R_0^2}}$$

where $\lambda_1$ is the wavelength of the return signal. If we apply the binomial theorem and neglect terms higher than $V^2/R_0^4$ $$\varphi_1(t) \approx \omega_1 t - \frac{4\pi R_0}{\lambda_1}\left(1 + \frac{V^2 t^2 - 2V x_1 t}{2 R_0^2} - \frac{V^2 x_1^2 t^2}{2 R_0^4}\right)$$

or $$\varphi_1(t) \approx \omega_1 t - \frac{4\pi R_0}{\lambda_1} + \frac{4\pi V t}{\lambda_1} \sin\theta - \frac{2\pi V^2 t^2}{\lambda_1 R_0} \cos^2\theta$$

If the target is nonisotropic, a certain characteristic phase shift $\Phi c_1(\omega_1)$, which will depend on frequency, will be associated with the return. This is what we are trying to measure.

Thus $$\varphi_1(t) = \omega_1 t - \frac{4\pi R_0}{\lambda_1} + \frac{4\pi V t \sin\theta}{\lambda_1} - \frac{2\pi V^2 t^2 \cos^2\theta}{\lambda R_0} + \varphi c_1.$$

Figure 2A:
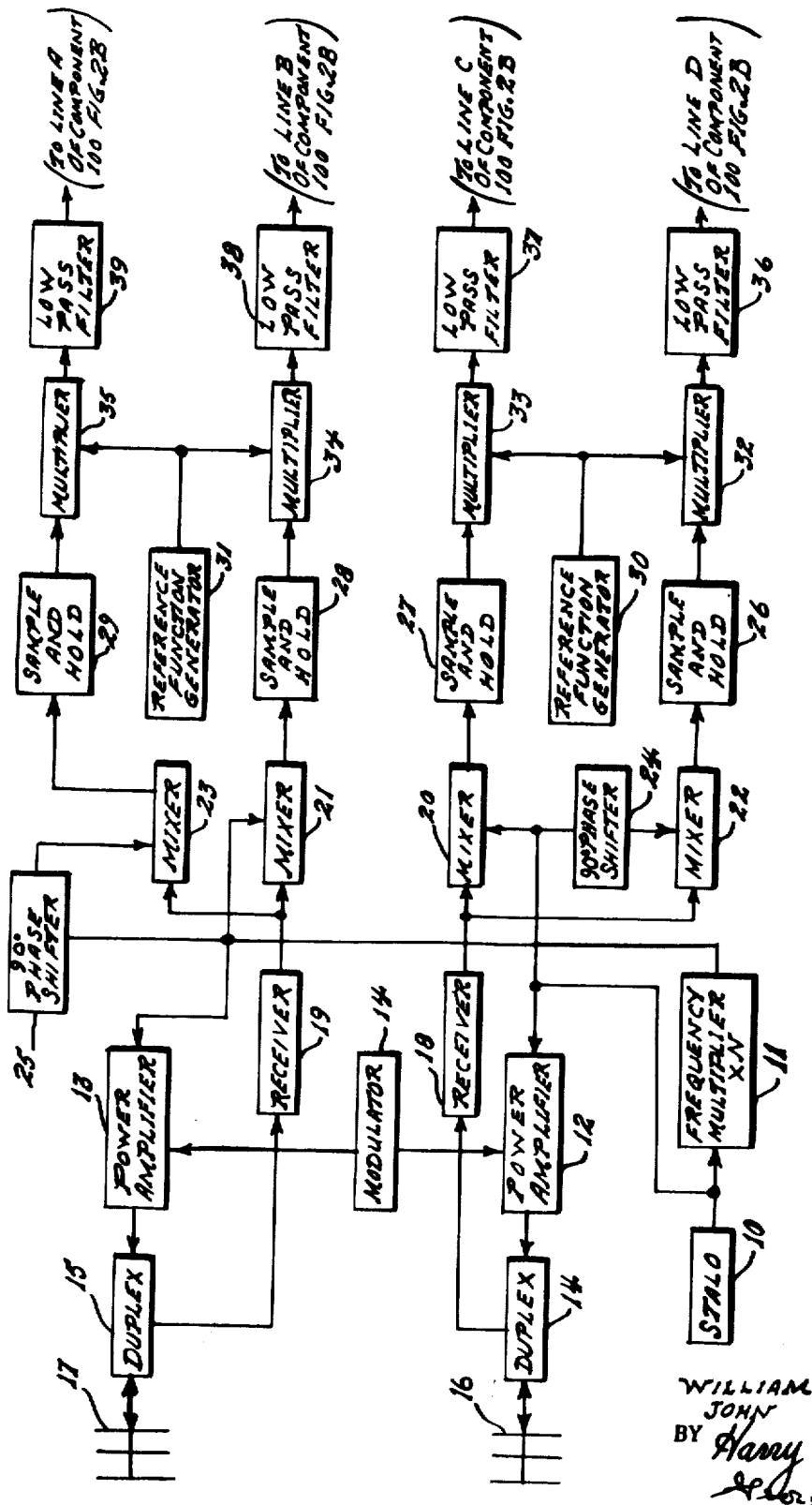

In order to see how this signal can be processed to obtain azimuth resolution (i.e. discrimination against returns from different values of $\theta$) and yet preserve the phase, consider the block diagram of FIG. 2A in detail. Stable oscillator (STALO) 10 generates a continuous signal at wave $\omega$. This goes to frequency multiplier 11 and is multiplied in frequency by N. The signal from STALO 10 goes to amplifier 12 and the signal from multiplier 11 goes to amplifier 13. Amplifiers 12 and 13 are pulsed power amplifiers and are pulsed by modulator 14. Thus the outputs from amplifiers 12 and 13 are a pair of harmonically related pulsed radar signals which are fed through duplexers 14 and 15 to airborne antennas 16 and 17, respectively, for direction toward targets of interest. Upon reflection from a target the return signals are received by antennas 16 and 17, passed through duplexers 14 and 15 to receivers 18 and 19, respectively. The signals are amplified by the receivers. The output of receiver 18 is given by $$S_1(t) = A_1 \cos\left(\omega_1 t - \frac{4\pi R_0}{\lambda_1} + \frac{4\pi Vt \sin\theta}{\lambda_1} - \frac{2\pi V^2 t^2 \cos^2\theta}{\lambda_1 R_0} + \varphi c_1\right)$$

and the output signal of receiver 19 at the higher frequency is given by $$S_2(t) = A_2 \cos\left(N\omega_1 t - \frac{4N\pi R_0}{\lambda_1} + \frac{4N\pi Vt \sin\theta}{\lambda_1} - \frac{2N\pi V^2 t^2 \cos^2\theta}{\lambda_1 R_0} + \varphi c_2\right)$$

The outputs of receivers 18 and 19 go to mixers 20 and 21, respectively. Mixers 20 and 21 receive simultaneously the outputs from STALO 10 and multiplier 11, respectively. Mixers 22 and 23 receive the outputs from receivers 18 and 19, respectively. Mixers 22 and 23 also receive simultaneously the outputs of STALO 10 and multiplier 11 by way of 90° phase shifters 24 and 25, respectively. Thus these signals are then mixed with in phase and quadrature components of the transmitted frequencies. The results of this are $$I_1(t) = A_1 \cos\left(\frac{-4\pi R_0}{\lambda_1} + \frac{4\pi Vt \sin\theta}{\lambda_1} - \frac{2\pi V^2 t^2 \cos^2\theta}{\lambda_1 R_0} + \varphi c_1\right)$$

$$Q_1(t) = A_1 \sin\left(\frac{-4\pi R_0}{\lambda_1} + \frac{4\pi Vt \sin\theta}{\lambda_1} - \frac{2\pi V^2 t^2 \cos^2\theta}{\lambda_1 R_0} + \varphi c_1\right)$$

$$I_2 = A_2 \cos\left(\frac{-4N\pi R_0}{\lambda_1} + \frac{4N\pi Vt \sin\theta}{\lambda_1} - \frac{2N\pi V^2 t^2 \cos^2\theta}{\lambda_1 R_0} + \varphi c_2\right)$$

$$Q_2 = A_2 \sin\left(\frac{-4N\pi R_0}{\lambda_1} + \frac{4N\pi Vt \sin\theta}{\lambda_1} - \frac{2N\pi V^2 t^2 \cos^2\theta}{\lambda_1 R_0} + \varphi c_2\right)$$

Since the returns are range dependent, it is necessary to process them in range, and this is most conveniently done at this point by a sample and hold circuit. The four outputs of mixers 20, 21, 22 and 23 are all sampled in conventional sample and hold circuits 26, 27, 28 and 29, respectively, simultaneously for one pulse width at a time corresponding to the return from $x_1, y_1$. The azimuth processing is done by forming the functions $$f_1 = \cos\left(4\pi Vt \sin\theta - \frac{2\pi V^2 t^2 \cos^2\theta}{\lambda_1 R_0}\right)$$

$$f_2 = \cos\left(4N\pi Vt \sin\theta - \frac{2N\pi V^2 t^2 \cos^2\theta}{\lambda_1 R_0}\right)$$

in conventional reference function generators 31 and 30. A reference function generator is an oscillator that generates a predetermined linear FM reference signal.

The two reference functions provided by reference function generators 30 and 31 are multiplied by the outputs of the sample and hold circuits in such a manner that multiplier 32 receives the outputs of sample and hold circuit 26 and reference function generator 30; multiplier 33 receives the outputs of sample and hold circuit 27 and reference generator 30; multiplier 34 receives the outputs of sample and hold circuit 28 and reference generator 31; and multiplier 35 receives the outputs of sample and hold circuit 29 and reference generator 31.

The outputs of multipliers 32, 33, 34 and 35 are passed through low pass filters 36, 37, 38 and 39, respectively. The results of the multiplication after passing through the low pass filters are:

$$PI_1 = A_1 \cos\left(\frac{-4\pi R_0}{\lambda_1} + \phi c_1\right)$$

$$PQ_1 = A_1 \sin\left(\frac{-4\pi R_0}{\lambda_1} + \phi c_1\right)$$

$$PI_2 = A_2 \cos\left(\frac{-4N\pi R_0}{\lambda_1} + \phi c_2\right)$$

$$PQ_2 = A_2 \sin\left(\frac{-4N\pi R_0}{\lambda_1} + \phi c_2\right)$$

The appropriate aforementioned outputs are indicated in FIG. 2 on lines A, B, C and D.

Note that this scheme discriminates against signals returning from angles other than $\theta$ because they will not arrive at the multiplier with a phase that is constant with respect to the reference function. The result of the multiplication will then be time varying (approx. sinusoidal) and will be attenuated by the low pass filter.

Now referring to FIG. 2B, in order to find the values of $A_1$, $A_2$ and phase angles, the quadrature components must be combined. The magnitudes are obtained by squaring, summing and taking the square roots.

$$A_1^2 = A_1^2 \cos^2\left(\frac{-4\pi R_0}{\lambda_1} + \varphi c_1\right) + A_1^2 \sin^2\left(\frac{-4\pi R_0}{\lambda_1} + \varphi c_1\right)$$

The angle is determined by dividing the two quadrature functions and taking the inverse $$\Phi_1 = \frac{-4\pi R_0}{\lambda_1} + \phi c_1 = \tan^{-1}\left(\frac{A_1 \sin\left(\frac{-4\pi R_0}{\lambda_1} + \phi c_1\right)}{A_1 \cos\left(\frac{-4\pi R_0}{\lambda_1} + \phi c_1\right)}\right)$$

Magnitude $A_2$ and angle $\Phi_2 = -4N\pi R_0/\lambda + \Phi c_2$ are determined in the same way. Note that the phase angles $\Phi_1$ and $\Phi_2$ are range dependent and that to determine the target characteristic angle $\Phi c_1$, it is necessary to know the range to a small fraction of a wavelength. Of course, this is impossible. In the dual harmonic frequency technique we determine the phase angle difference $N\Phi c_1 - \Phi c_2$. By multiplying $\Phi_1$ by $N$ we obtain $$N\Phi_1 = -4N\pi R_0/\lambda_1 + N\Phi c_1.$$

We then subtract $$\Phi_2 = -4N\pi R_0/\lambda_1 + \Phi c_2$$

from this, and in so doing the range terms are cancelled out. The phase angle $N\Phi c_1 - \Phi c_2$ will be characteristic of target size, shape, and composition, and may be used for target signature information on display 60. Display 60 also receives the signals $A_1$ and $A_2$.

The above operation of obtaining magnitudes and angles of $A_1$ and $A_2$ are performed by conventional digital computer 100 as shown in FIG. 2B. Digital computer 100 receives inputs on lines A, B, C and D as indicated thereupon. The inputs on lines A and B are squared at 40 and 42. The inputs on lines A and B are divided by each other at 41 and the inverse tangent is then obtained. The inverse tangent is multiplied by $N$ at 45 and is fed to subtractor 46. The square of signals on lines A and B are fed to summer 47. The output of summer 47 is fed to square root 56 which provides an output to display 60. The inputs to lines C and D are squared at 50 and 52 and fed to summer 54. The output of summer 54 is fed to obtain a square root at 55. The square root thereof is fed to display 60. The inputs to lines C and D are divided against each other at 51 and the inverse tangent of the resultant is obtained at 53. The inverse tangent signal is fed to subtractor 46 which provides an output which is fed to display 60.

Figure 3:
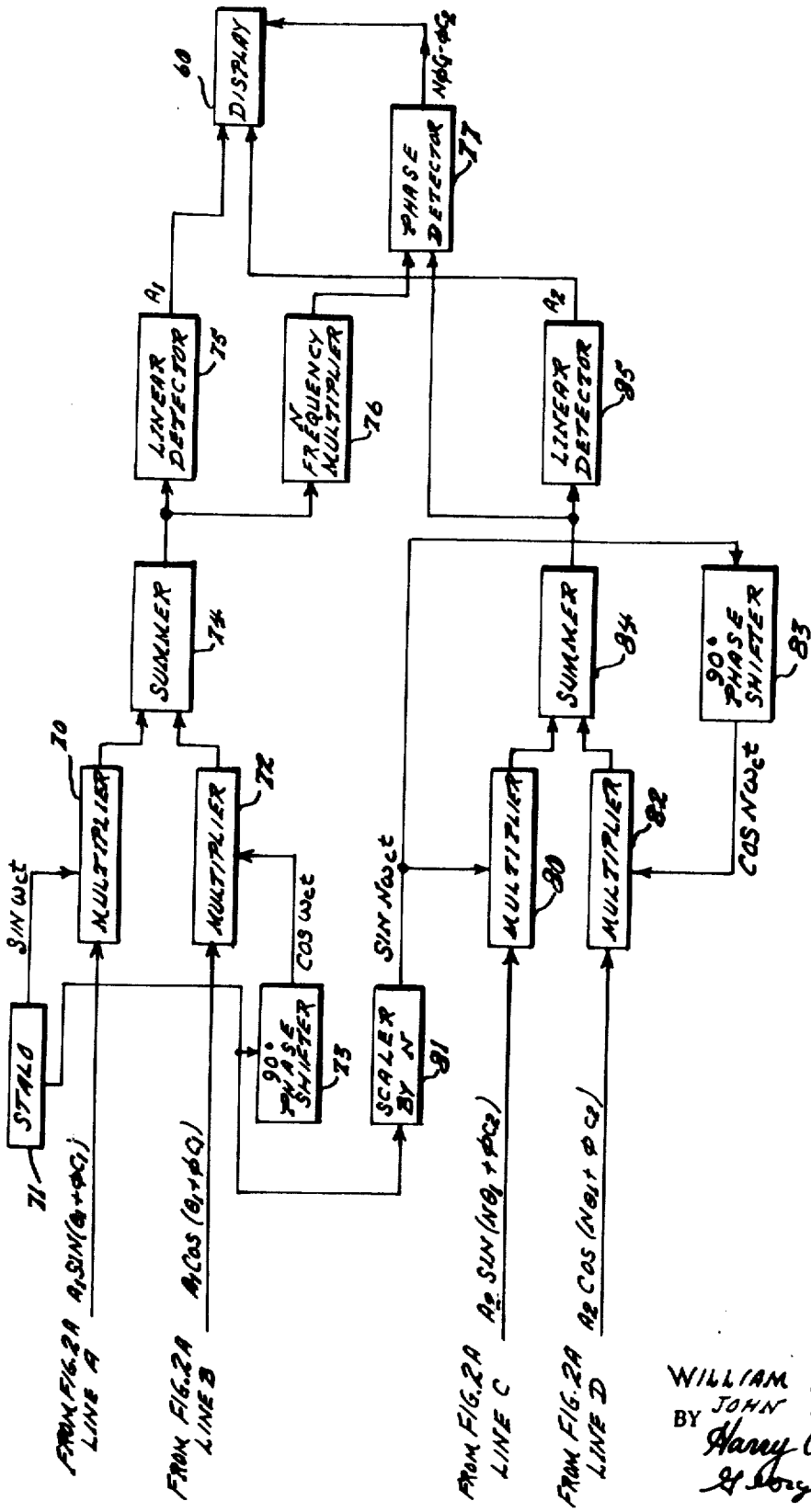
FIG. 3 shows a second apparatus to be utilized in substitution for the conventional digital computer indicated by the enclosed dotted lines in FIG. 2B.

Now with reference to FIG. 3, which is an analog apparatus utilized in substitution of digital computer 100 of FIG. 2, the two signals $A_1 \sin \Phi_1$ and $A_1 \cos \Phi_1$, are multiplied by quadrature sinusoids at a convenient frequency $\omega_r$. $A_2 \sin(\Phi_2)$ and $A_2 \cos(\Phi_2)$ are similarly multiplied by $\sin N\omega_r t$ and $\cos N\omega_r t$. These pairs are each sent to an individual summer. Refer to phasor diagram FIG. 4. Because of multiplication by quadrature components the two phasors $A_1 \sin(\Phi_1)$ and $A_1 \cos(\Phi_1)$ are at 90° phase angles with one another. Summing these two phasors forms a phasor of magnitude $A_1$ and phase angle $\Phi_2$. This phasor can be detected in a linear detector to determine $A_1$. If the lower frequency phasor is multiplied in frequency by $N$ a phase comparison can be made between the two which will yield the phase angle $N\Phi_1 - \Phi_2 = N\varphi c_1 - \varphi c_2$. These signals can be displayed in the following way on a color oscilloscope such as display 60. Range $-x$ axis, azimuth $-y$ axis, phase ($N\Phi c_1 - \Phi c_2$) color, target size-intensity.

Now referring in greater detail to the components of FIG. 3, the signal input on line A is fed to multiplier 70. STALO (stable local oscillator) 71 feeds a predetermined signal $\sin \omega_c t$ also to multiplier 70. The input signal on line B is fed to multiplier 72 which also receives a signal $\cos \omega_c t$ from STALO 71 by way of 90° phase shifter 73. The outputs of multipliers 70 and 72 are added in summer 74 and then fed simultaneously to linear detector 75 and N frequency multiplier 76. Signal output $A_1$ of linear detector 75 is fed to display 60 and the signal output of multiplier 76 is fed to phase detector 77. Multiplier 80 receives a pair of input signals, one from line c and the other from STALO 71 by way of N scaler 81. Multiplier 82 receives a pair of input signals, one being from line D and the other from STALO 71 by way of N scaler 81 and 90° phase shifter 83. The outputs of multipliers 80 and 82 are added in summer 84 and then fed simultaneously to linear detector 85 and phase detector 77. The output of detector 85 and phase detector 77 are fed to display 60.

It is to be noted that the description for FIG. 3 includes analog means. It is noted that it is also possible to perform the operation described by digital means.

We claim:

1. A dual harmonic frequency synthetic aperture radar comprising first means to generate a stabilized continuous wave signal at a predetermined frequency to provide a first signal, first means to frequency multiply said continuous wave signal by a factor N to provide a second signal, means to pulse said first and second signals, first and second moving airborne antenna means receiving said first and second signals, respectively, for direction toward a target of interest, first and second means to receive return signals from said target of interest resulting from the first and second pulsed signals, respectively, being directed toward said target of interest, first, second, third, and fourth mixers, first and second 90° phase shifters receiving as inputs said first signal and said second signal, respectively, said first mixer receiving simultaneously the output signal from said first receiving means and said first signal, said second mixer receiving simultaneously the outputs from said first receiving means and said first 90° phase shifter, said third mixer receiving simultaneously the output signal from said second receiving means and said second signal, said fourth mixer receiving simultaneously the outputs of said second receiving means and said second 90° phase shifter, first, second, third and fourth sample and hold circuits receiving the outputs of said first, second, third and fourth mixers, respectively, first and second reference function generators, each having predetermined output being a linear frequency modulated reference signal, first, second, third and fourth multipliers, said first multiplier receiving simultaneously the outputs from said first sample and hold circuit and said first reference function generator, said second multiplier receiving simultaneously the outputs from said second sample and hold circuit and said first reference function generator, said third multiplier receiving simultaneously the outputs from said third sample and hold circuit and said second reference function generator, said fourth multiplier receiving simultaneously the outputs from said fourth sample and hold circuit and said second reference function generator, first, second, third and fourth low pass filters passing the outputs of said first, second, third and fourth multipliers, respectively, to provide amplitude and phase signals representative of said target of interest.

2. A dual harmonic frequency synthetic aperture radar as described in claim 1 further including fifth, sixth, seventh and eighth multipliers, second means to generate a predetermined stabilized continuous wave signal to provide a third signal, third and fourth 90° phase shifters, means to scale a signal by a factor N, said fifth multiplier receiving simultaneously the output signal from said first low pass filter and said third signal by way of said scaling means, said sixth multiplier receiving simultaneously the output of said second low pass filter and said third signal by way of said scaling means and said third 90° phase shifter, said seventh multiplier receiving simultaneously the output of said third low pass filter and said third signal by way of said fourth 90° phase shifter, said eighth multiplier receiving simultaneously the output of said fourth low pass filter and said third signal, first and second summers, said first summer adding the outputs of said fifth and sixth multipliers to provide a first resultant signal, said second summer adding the outputs of said seventh and eighth multipliers to provide a second resultant signal, first and second linear detectors receiving said first and second resultant signals to provide outputs representative of the magnitudes of the two received return signals, second means to frequency multiply by a factor N, said second frequency multiplier receiving the output of said second summer, and phase detector receiving the output signal from said second frequency multiplier and said first resultant signal, said phase detector providing an output phase signal characteristic of said target of interest.

3. A dual harmonic frequency synthetic aperture radar as described in claim 2 further including display means receiving the output signals from said first and second linear detector and phase detector.